L. L. LEWIS.
PELT STRETCHING FRAME.
APPLICATION FILED JULY 13, 1911.

1,006,855.

Patented Oct. 24, 1911.

Witnesses
L. B. James
E. M. B. Somers

Inventor
Leo L. Lewis
by H. B. Willson & Co.
Attorneys

UNITED STATES PATENT OFFICE.

LEO L. LEWIS, OF MONTPELIER, IDAHO.

PELT-STRETCHING FRAME.

1,006,855.  Specification of Letters Patent. Patented Oct. 24, 1911.

Application filed July 13, 1911. Serial No. 638,302.

*To all whom it may concern:*

Be it known that I, LEO L. LEWIS, a citizen of the United States, residing at Montpelier, in the county of Bear Lake and State of Idaho, have invented certain new and useful Improvements in Pelt-Stretching Frames; and I do declare the following to be a full, clear, and exact description of the invention, such as will enable others skilled in the art to which it appertains to make and use the same.

This invention relates to improvements in frames for stretching pelts.

One object of the invention is to provide a stretching frame of this character which is particularly adapted for stretching the pelts or skins of small animals, and which is provided with an improved means for readily securing and fastening the skin thereto whereby the skin may be quickly and thoroughly stretched in all directions.

Another object is to provide an adjustable pelt stretching frame from which the skin may be readily removed after being stretched without danger of tearing or injuring the same.

With these and other objects in view, the invention consists of certain novel features of construction, combination and arrangement of parts as will be more fully described and claimed.

Figure 1:
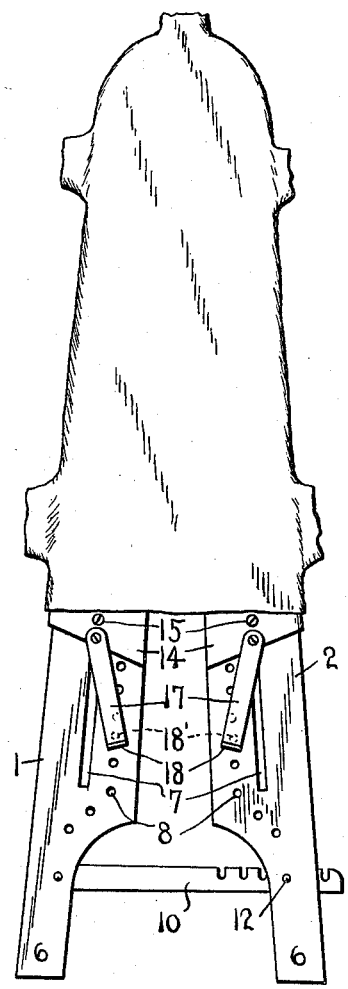
Figure 2:
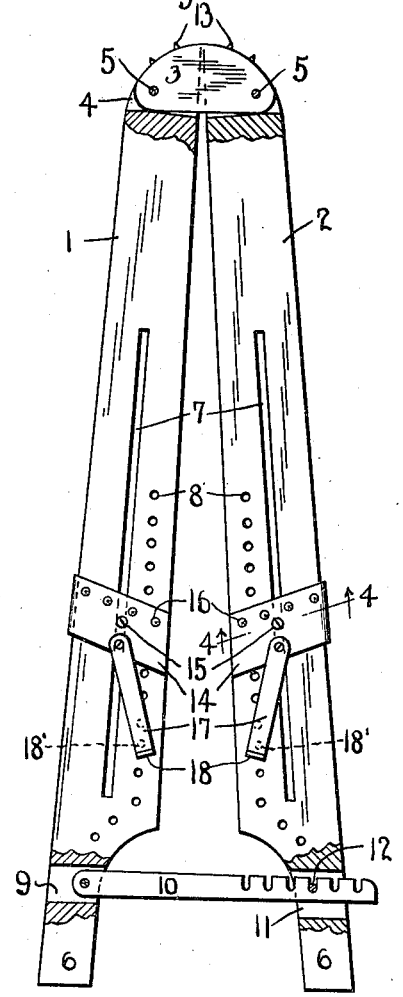
Figure 3:
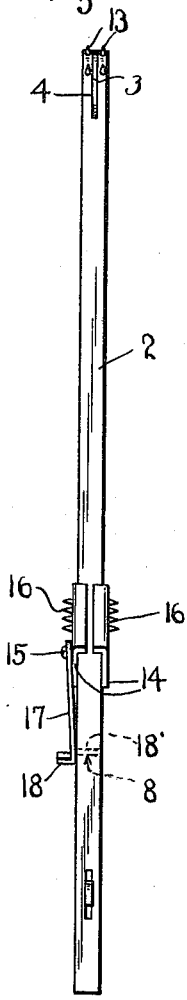
Figure 4:
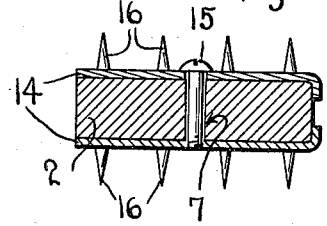

In the accompanying drawings: Figure 1 is a plan view of my improved stretching frame showing a pelt arranged thereon; Fig. 2 is a similar view of the frame with the pelt removed and parts broken away and in section; Fig. 3 is a side view of the same; Fig. 4 is a cross sectional view on the line 4—4 of Fig. 2.

My improved stretching frame comprises two stretching arms or bars 1 and 2 said bars preferably tapered on their outer edges from their inner toward their outer ends and have their outer end corners rounded off as shown. The bars 1 and 2 are hingedly connected together at their rounded outer ends by means of a pivot plate 3 which is engaged with notches or mortises 4 formed in the ends of the bars and through which and said ends are inserted pivot pins 5. The bars 1 and 2 are recessed or cut away on the inner edges of their inner ends to form handles 6 whereby the bars are manipulated. In the bars 1 and 2 are formed longitudinally disposed slots 7 and adjacent to their inner edges the bars are provided with longitudinal series of apertures 8.

In the handle of the bar 1 is formed a transversely disposed slot 9 in which is pivotally secured one end of a rack bar 10 the opposite end of which is slidably engaged with a slot 11 formed in the handle of the bar 2. In said handle of the bar 2 is also arranged a transversely disposed rack engaging pin 12, said pin intersecting the slot 11 in position to be engaged by the teeth of the bar 10 when the latter is swung upwardly into engagement therewith. By thus arranging the rack bar 10 and pin 12 the stretching arms or bars 1 and 2 may be securely held in the position to which they have been adjusted to stretch the skin.

In the rounded outer ends of the bars 1 and 2 are arranged a series of skin or pelt engaging pins 13 by means of which the outer end of the pelt is secured to the ends of the bars. Slidably engaged with the opposite sides of the slotted portions of the bars 1 and 2 are spaced stretching devices comprising pairs of bar engaging plates 14, said plates being arranged diagonally across the bars as shown. Said pairs of plates are arranged on opposite sides of the bars 1 and 2 and the outer ends of the plates are bent inwardly at right angles and slidably engage the outer edges of the bars and thus guide the plates when adjusted. The plates are held in sliding engagement with the bars 1 and 2 by means of screws 15 which are inserted through apertures in the plates on one side of the bars and are screwed into alined threaded apertures in the other plates, said bolts passing through the slots 7. Arranged in the plates 14 are sharp outwardly projecting pelt stretching pins or spurs 16 with which are adapted to be engaged the inner ends of the skin or pelt whereby the latter may be stretched longitudinally when the plates are thrown toward the handles of the bars 1 and 2 and by means of which said ends of the pelts are securely held after being stretched and while drying. Pivotally connected at their inner ends to the plates 14 on one side of the bars 1 and 2 are plate operating and adjusting levers 17 having their outer ends bent outwardly at an angle to form gripping members or handles 18 and having secured to their inner sides fastening pins 18' which are adapted to be engaged with the apertures 8 in the bars 1 and 2 whereby said plates are secured in their adjusted positions.

By constructing the stretching frame as herein shown and described the bars 1 and 2 of the latter may be brought together and the width of the frame thus reduced to permit the same to be readily slipped into or engaged with a pelt after which the handle ends of the bars are spread apart and fastened by the rack bar 10 and pin 12 thus laterally stretching and holding said skin in stretched position. After thus being stretched the inner ends of the skin are engaged with the pins or spurs 16 on the plates 14 and the latter then drawn inwardly toward the handles after which, when the skin has been stretched in this direction to the desired extent the fastening pins on the levers 17 are engaged with the nearest aperture 8 in the bars 1 and 2 and said stretching plates 14 thus secured and the skin held in a stretched position. After the skin has thus been stretched and has dried, the stretching plates are released and the spurs thereon disengaged from the skin after which the rack bar 10 is released and the handle ends of the bars 1 and 2 brought together, thus reducing the width of the frame and permitting the same to be readily withdrawn from the pelt.

From the foregoing description taken in connection with the accompanying drawings the construction and operation of the invention will be readily understood without requiring a more extended explanation.

Various changes in the form, proportion and the minor details of construction may be resorted to without departing from the principle or sacrificing any of the advantages of the invention claimed.

Having thus described my invention, what I claim is:

1. In a pelt stretching frame a pair of stretching bars hingedly connected at one end, pairs of stretching plates slidably engaged with said bars, pins arranged on said plates and adapted to be engaged with the ends of the pelt when stretched by said bars, and means to hold said plates in position for stretching and holding the pelt.

2. In a pelt stretching frame a pair of stretching bars hingedly connected at one end, handles formed on the opposite ends of said bars, said handles having formed therein transversely disposed slots, a fastening pin arranged in one of said handles, a rack bar pivotally secured in the slot of the opposite handle and adapted to work through the slot in the handle having said fastening pin and to be engaged with said pin whereby the handle ends of the bars are held apart, pairs of stretching plates slidably engaged with said bars, pins arranged on said plates and adapted to be engaged with the ends of the pelt when stretched by said bars, and means to hold said plates in position for stretching and holding the pelt.

3. In a stretching frame for pelts, a pair of stretching bars hingedly connected at one end, said bars having formed therein longitudinally extending slots and a longitudinal series of apertures, handles arranged on the free ends of said bars, means to hold said handle ends of the bars extended or in operative position for laterally stretching the pelt, pairs of pelt stretching and fastening plates arranged on opposite sides of said bars, screws engaged with said plates and projecting through the slots in said bars whereby the plates are slidably secured to the bars, guide flanges formed on the outer edges of the plates and having a sliding engagement with the outer edges of the bars, sharp pelt engaging pins arranged on and projecting laterally from the outer sides of said plates, plate adjusting and fastening levers pivotally connected at their inner ends to the plates on one side of the bars, handles formed on the outer ends of said levers and fastening pins arranged on the inner sides of the levers and adapted to be engaged with the apertures in said bars whereby the plates are fastened in their adjusted position on the bars.

4. In a stretching frame for pelts, a pair of stretching bars hingedly connected at one end, said bars having formed therein longitudinally extending slots and a longitudinal series of apertures, means to hold the free ends of said bars extended in operative position for laterally stretching the pelt, pairs of pelt stretching and fastening plates arranged on opposite sides of said bars, means for adjustably engaging said slots and connected with said plates to adapt them to slide on said bars, pelt engaging pins arranged on and projecting laterally from the outer sides of said plates, plate adjusting and fastening levers pivotally connected at their inner ends to the plates on one side of the bars, handles on the free ends of said levers and fastening pins arranged on the inner sides of the levers and adapted to be engaged with the apertures in said bars whereby the plates are fastened in their adjusted position on the bars.

In testimony whereof I have hereunto set my hand in presence of two subscribing witnesses.

LEO L. LEWIS.

Witnesses:
R. A. SULLIVAN,
LUCILE HALL.

---

Copies of this patent may be obtained for five cents each, by addressing the "Commissioner of Patents, Washington, D. C."